May 2, 1967 R. C. BRAUN 3,317,007
CONTINUAL-SELF-ADJUSTING WHEEL CHOCK UNIT
Filed Feb. 3, 1966

INVENTOR.
BY Robert C. Braun

United States Patent Office 3,317,007
Patented May 2, 1967

1

3,317,007
CONTINUAL-SELF-ADJUSTING WHEEL
CHOCK UNIT
Robert C. Braun, 20 Strawberry Hill Road,
Hillsdale, N.J. 07642
Filed Feb. 3, 1966, Ser. No. 527,394
1 Claim. (Cl. 188—32)

This invention relates to a continual-self-adjusting wheel chock unit, for use in blocking the wheels of a camping trailer, for example when erecting said camper.

As is well known, there is objectional free rolling movement when the sliding beds are pulled open in the process of erecting a camping trailer. There is also considerable rolling motion, to and fro, when a person walks in said camper, causing, in some people, the effects of being on a boat.

Accordingly, the present invention has for its object, a reliable, continual-self-adjusting wheel chock unit, which eliminates the aforementioned, free rolling movement and rolling motion, in either direction.

A preferred and practical embodiment of the invention is shown in the accompanying drawings, in which.

Figure 1:
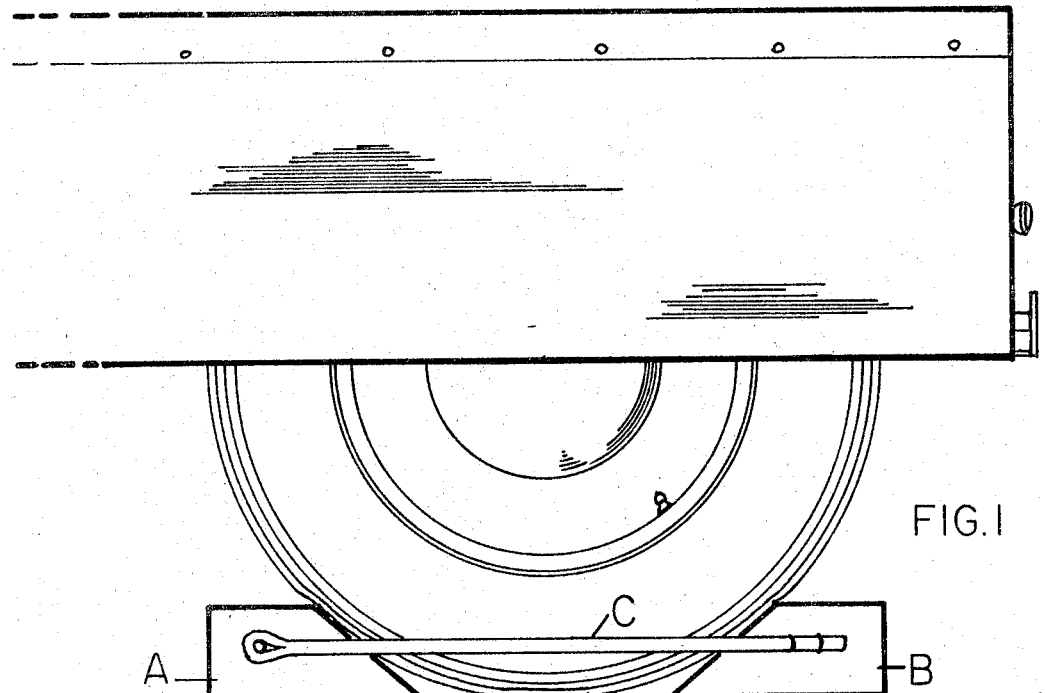
FIGURE 1 is a view illustrating the application of the invention.
Figure 2:
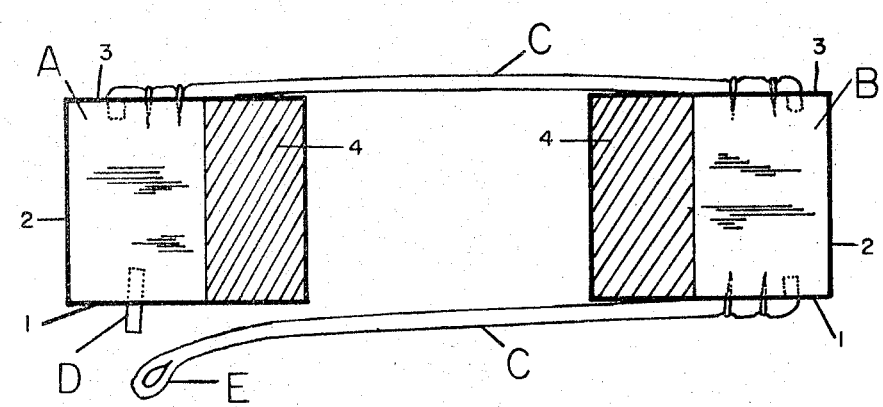
FIGURE 2 is a top view of the complete unit.
Figure 3:
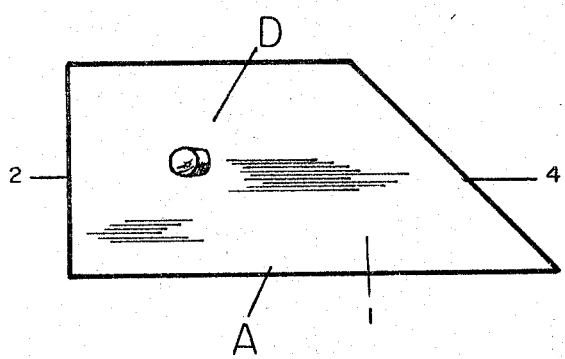
FIGURE 3 is a cross section of block A in FIGURE 2.

The complete unit consists of the duplicate chock blocks designated A and B in the accompanying drawings, connected by cloth covered elastic rubber lines designated C. (FIGURE 2.) Chock blocks A and B differ only in that, block A has a peg (D) extending from side 1. (FIGURE 3.)

A description of one block will suffice for the other. The overall lenght of block A sides 1 and 3 is approximately 3¾ inches. The width of sides 2 and 4 is approximately 3½ inches. The height of sides 1, 2, and 3 is approximately 1½ inches. The width of top is approximately 2¼ inches. The angle of tire engaging face, side 4, is approximately 45 degrees. The peg (D) being of metal or wood, extends horizontally from side 1, approximately ½ inch, at an angle of approximately 5 degrees toward side 2.

Connecting lines (C) are approximately 9 inches in length when not under tension. Diameter of lines is approximately ¼ inch. Lines C in FIGURE 2 are secured at points attached on blocks A and B by means of metal staples.

Chock blocks A and B are connected permanently by line C on sides 3. (FIGURE 2.) Line C is also connected permanently on side 1 of block B. (FIGURE 2.)

The loose end of line C is terminated in loop E. (FIGURE 2.)

2

From the foregoing, it will be seen, that by passing block A behind the tire from right to left, then holding the block in engagement and under tension, with side 4 against the tire surface and ground surface, block B is then pulled to the opposite edge of the tire with the right hand and engaged in a like manner. Upon stretching the loose end of the line (C) so as to place the loop (E) around the peg, (D) tension is obtained in both lines (C) and the application of the invention is completed.

The unit will quickly and easily disengage by reversing the procedure of attachment.

I claim:

A continual-self-adjusting wheel chock unit for engaging the surface of a tire affixed to the wheel comprising:
a pair of blocks;
each of said blocks having two opposed, parallel sides, a bottom surface and a top surface connecting the parallel sides and a face connecting the bottom surface and the top surface, the face making an acute angle with the bottom surface;
a first, cloth covered elastic line having a first end and a second end, the first end being permanently attached to one of the parallel sides of one of the pair of blocks, the second end being permanently attached to one of the parallel sides of the other of the pair of blocks such that the faces of the pair of blocks face each other and are drawn toward each other by the contraction of the first, cloth covered elastic line;
a peg mounted in the other of the parallel sides of one of the pair of blocks;
a second, cloth covered elastic line having a first end and a second end, the first end having a loop therein to engage the peg, the second end being permanently attached to the other of the parallel sides of the other of the pair of blocks;
the faces of the pair of blocks being drawn toward each other to snugly engage the surface of a tire when the loop is engaged with the peg to thereby prevent the wheel, to which the tire is affixed, from moving.

References Cited by the Examiner
UNITED STATES PATENTS

| 866,474 | 9/1909 | Keeran. |
| 1,407,338 | 2/1922 | Skiles. |

FOREIGN PATENTS

| 529,235 | 9/1921 | France. |
| 135,762 | 5/1961 | U.S.S.R. |

MILTON BUCHLER, *Primary Examiner.*

B. S. MOWRY, T. W. BUCKMAN, *Assistant Examiners.*